United States Patent [19]

Boughton et al.

[11] Patent Number: 4,603,875
[45] Date of Patent: Aug. 5, 1986

[54] BICYCLE FRONT WHEEL HOLDER

[75] Inventors: Matthew S. Boughton, Danbury; Mark T. La Plante, Ridgefield, both of Conn.

[73] Assignee: Canondale Corporation, Georgetown, Conn.

[21] Appl. No.: 769,554

[22] Filed: Aug. 26, 1985

[51] Int. Cl.$^4$ .............................................. B62H 3/04
[52] U.S. Cl. .................... 280/272; 280/296; 280/289 R; 70/228
[58] Field of Search .................. 280/296, 293, 289 R; 70/228

[56] References Cited

U.S. PATENT DOCUMENTS 658,023 9/1900 Shanklin .............................. 280/296
3,924,487 12/1975 Huret et al. ...................... 280/289 R
4,185,850 1/1980 Levine et al. ....................... 280/296

Primary Examiner—John J. Love
Assistant Examiner—Donn McGiehan
Attorney, Agent, or Firm—Brumbaugh, Graves, Donohue & Raymond

[57] ABSTRACT

A bicycle front wheel holder is provided for releasably locking the front wheel of a bicycle in fixed rotational position relative to the bicycle frame and for keeping the front wheel from turning. The wheel holder comprises two bracket members adapted to replace the shift lever stopper members in conventional multispeed shifting assemblies. The bracket members receive a wire form member for pivotal rotation between a first position wherein the wire form contacts the front wheel, and a second position free of contact with the front wheel.

12 Claims, 4 Drawing Figures

BICYCLE FRONT WHEEL HOLDER

BACKGROUND OF THE INVENTION

This invention relates to devices for parking and immobilizing bicycles, and more particularly to a device which holds the front wheel of a bicycle in fixed rotational position relative to the bicycle frame and for keeping the front wheel from turning, and yet can be easily released automatically if the bicycle is moved forwardly.

Numerous devices have been proposed and used for holding bicycles upright or immobilized, such as conventional kickstands and locking mechanisms for locking the front wheel in place. Most of the devices for locking the front wheel in place require manual release and engagement by a bicyclist. One such device, however, as shown and described in U.S. Pat. No. 4,185,850, is an automatic release bicycle holder which holds the front wheel in place, and will automatically release if the bicycle is moved forwardly. The device shown in that patent comprises a C-shaped clamp member which is adapted to be clamped around the down tube of a bicycle. The bottom portion of the clamp is a rectangular block, the bottom front corners of which are cut out. The sidewalls of the cutout are provided with aligned openings. A heavy wire spring frame is provided with spaced-apart parallel arms having inturned ends received by the aligned openings in the block to allow pivotal movement of the wire frame. Beneath each pivot opening, the block has a rib that holds the wire frame away from the front wheel. When the wire frame is released from the ribs and brought into firm engagement with the front wheel of the bicycle, it prevents the wheel from rotating or pivotal movement, and prevents the bicycle from rolling, so that it can be easily leaned up against a wall or post without falling over. When the bicycle wheel is moved forwardly, the wire frame member is urged by the rotation of the wheel away from the wheel, so that no manual release of the wire frame is required by the bicycle rider. A second embodiment shown in this patent has a rectangular block of metal that is welded to the bicycle down tube instead of being affixed by a clamp.

Each of the two embodiments in this patent has a number of disadvantages. In the embodiment where the block is welded to the down tube, the welding of such a block should be done during manufacture and before painting of the bicycle, and requires finishing of the weld joint to create an acceptable appearance. Further, the weakening of the down tube caused by the welding might affect the integrity of the tube. The appearance alone of the block is unacceptable to many bicycle riders.

In the second embodiment, in which the clamp is fitted around the down tube, the clamp may mar the paint on the down tube, or slide on the down tube if it is not adequately tightened. Moreover, these clamps do not work on some bicycles having other than conventionally-sized down tubes, especially aluminum bicycles with large diameter tubes, unless clamps are sold in a variety of sizes, which would require bicycle dealers to stock many differently sized clamps. Further, such a clamp may interfere with the mounting additional accessories such as water bottle holders, pumps, and shift lever clamps. The presence of a clamp on a down tube is unacceptable to many experienced bicycle riders who prefer their accessories to be simple in design and unobtrusive in appearance.

If would be advantageous to provide a bicycle parking stand which would easily fit to almost any bicycle regardless of the size of the down tube, and which is also light-weight and easy to install. It would also be advantageous if such a parking stand does not have any part which contacts the down tube, thereby reducing the risk of damage to the bicycle paint, and to be simple in design and appearance to appeal to bike afficionados who like their accessories to be unobtrusive.

SUMMARY OF THE INVENTION

In accordance with the present invention a bicycle front wheel holder is provided for use in holding the front wheel of a bicycle in fixed rotational position relative to the bicycle frame and for keeping the front wheel from turning.

The front wheel holder comprises a resilient wire form member having a first free end and a second free end and a loop in its mid-section away from the first and second free ends and a pair of bracket members one of which is adapted to be connected to the right shifter stud on the down tube of a bicycle and having means for receiving the first free end of the wire form member for pivotal rotation and the other of which is adapted to be connected to the left shifter stud of the down tube of a bicycle and has means for receiving the second free end of the wire form member for pivotal rotation. When the wire form member is received in the respective receiving means in the first and second bracket members, the loop of the wire form member extends away from the down tube and firmly contacts the front wheel to keep it from rotating and turning when the wire form member is in a first pivotal position. The loop extends away from, and free of contact with, the front wheel when in a second pivotal position.

The first and second bracket members are preferably designed to replace the shift lever stopper members in conventional shifting assemblies, and therefore preferably incorporate integral shift stopper means such as an extending tab or the like. The bicycle front wheel holder in accordance with the invention can be used with virtually any bicycle having shift lever studs on the down tube, irrespective of the diameter of the down tube, creates a clean and neat appearance and, preferably, has no part that contacts the down tube and might damage the paint on the bicycle. Numerous other advantages will become apparent to those skilled in the art when considering the following detailed description, accompanying drawings and appended claims.

DESCRIPTION OF THE PREFERRED EMBODIMENT

Figure 1:
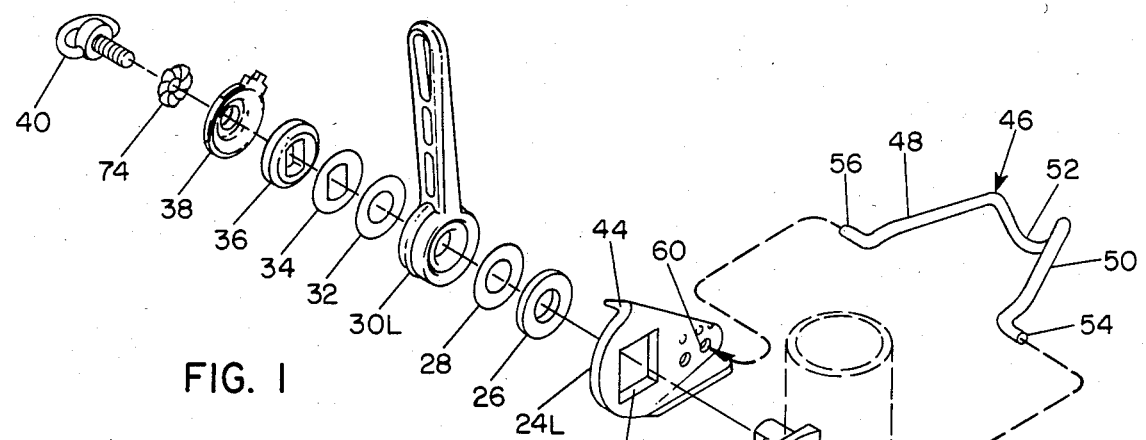
FIG. 1 is an exploded pictoral view of an embodiment of a bicycle wheel holder, in accordance with the invention, and also shows a standard shift lever assembly.

The embodiment of the invention is integrated into the shifter assemblies of the bicycle, which are largely standardized among various suppliers. As shown in FIG. 1, each shifter assembly (only the left one is shown) comprises a shifter stud 20, which is suitably affixed to the side of the downtube 22 of the frame, a lever stopper washer (not shown, because it is replaced by a component 24 of the present invention, as described below), a spacer 26, a washer 28, a shift lever 30, washers 32 and 34, a spacer 36, a lever cover 38, and a lever adjusting bolt 40. Of course such a lever assembly can be used in conjunction with shifter bosses that are attached to a C-clamp which fits around a bicycle tube 22 instead of being brazed on, as shown, or in conjunction with a shifter boss assembly shown in U.S. patent application Ser. No. 769,577, filed Aug. 26, 1985, entitled "Bicycle Shifter Boss Assembly", in the name of Thomas C. Patterson and assigned to the assignee of the present invention. When assembled on to the bicycle tube, the shift levers control gear changing cables that run to the rear and front chain derailleurs, respectively.

According to the invention, a right bracket member 24R is adapted to replace the right lever stopper of a conventional shifter assembly, and a left bracket member 24L is adapted to replace the left lever stopper of a conventional shift assembly. As shown, the shifter bosses 20 have square cross-section portions at their bases which are adapted to be received in and register with the respective square openings 42 of the right and left bracket members 24R and 24L. The right and left washer members also have lever stopper tabs 44, which serve the same function as the lever stopper tabs on conventional lever stoppers.

The preferred embodiment also comprises a wire form member 46 having basically a V-shape with two arms 48 and 50 joined at their bottom to form a loop 52, and having a first free end 54 and a second free end 56 extending outwardly from the arms and from each other. The respective free ends 54 and 56 are received in holes 58 and 60, respectively, on the inside surfaces of the right and left bracket members.

Figures 2, 3:
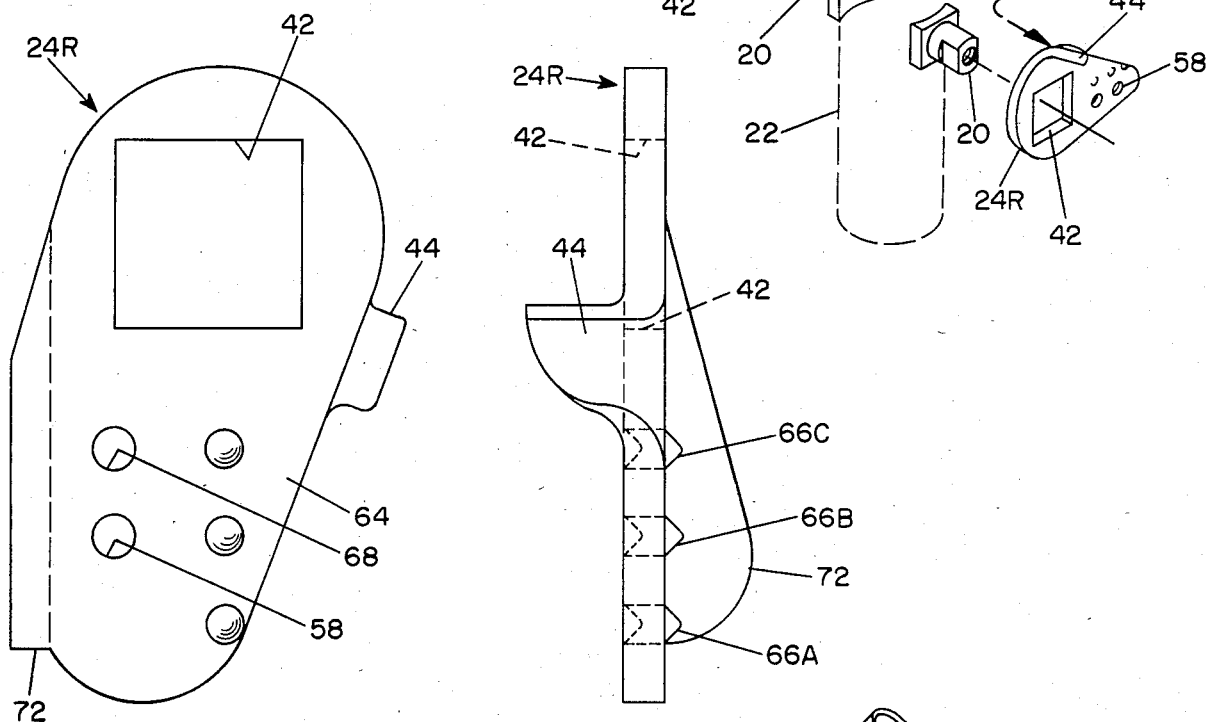
FIG. 2 is a side elevational view of the right bracket member of the embodiment.
FIG. 3 is a front end view of the right bracket member.

The right and left bracket members are the mirror images of each other (right and left hand) but are otherwise identical. Referring to FIGS. 2 and 3, which show the right bracket member, the hole 58 is formed in an arm portion 64 that also has raised dimples 66A, 66B and 66C. The dimples 66A and 66B hold the wire form member 46 in a second pivotal position, the retracted position, indicated by the dotted lines of FIG. 4. The wire form member is resilient, and the distance between its first and second free ends 54 and 56 is, preferably, slightly greater than the distance between the holes 58 and 60 in the respective bracket members when the bracket members are fitted to the shifter bosses, thereby squeezing the ends of the wire form member slightly towards each other when the device is assembled.

Figure 4:
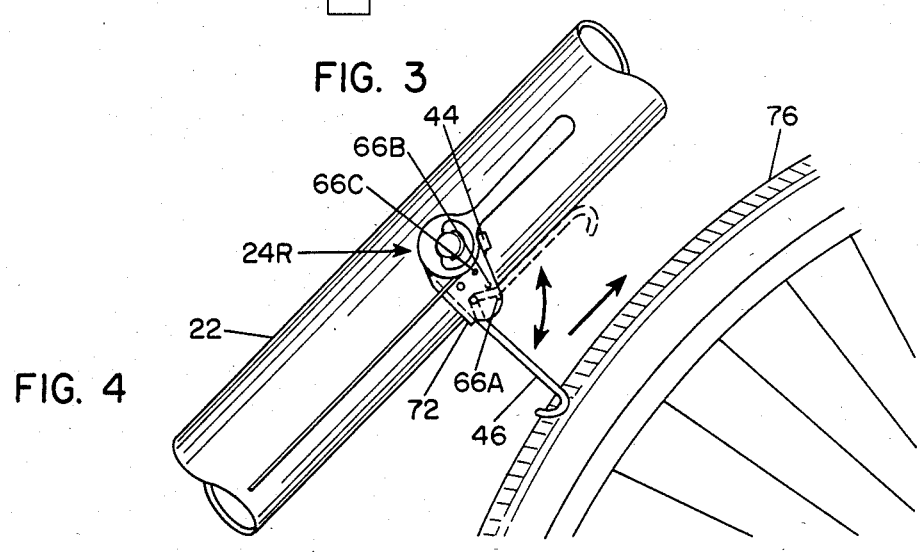
FIG. 4 is a side elevational view of the embodiment, showing the wire form member in its first position engaging the front wheel of the bicycle.

The arm portion 64 of the bracket member also has a second hole 68 that can receive the first end 54 of the wire form member for a better fit if the front wheel 70 of the bicycle is closer to the down tube 22 than in the arrangement shown in FIG. 4. In this case, the wire form member will be received between the dimples 66B and 66C when in the retracted position shown in the dotted lines in FIG. 4. The wire form member arms may be bent to from curves, if necessary, to shorten them in order to provide a better fit for a particular bicycle.

Each washer member also has a depending flange 72 which extends inwardly towards the other washer member when the device is installed. The flange 72 serves as a stopper to prevent the wire form member 46 from pivoting beyond its first pivotal position, the wheel locking position, as shown by the solid lines in FIG. 4.

As shown in FIG. 4, the wire form member 46 holds the front wheel 70 from rotating and turning relative to the bicycle frame when the wire form member is in the locking position. The wire form member is manually moved to the locking position. The lower end of each bracket member is intentionally rounded to guide the user's finger along a path that will prevent it from being pinched between the wire form member and the bracket member. The locking position is sustained by the resiliency of the tire, which is pressed in by look 52, and a slight overcenter position of the two arms 48 and 50. When the front wheel is rotated forward as shown in the direction of the arrow, the wire form member 46 will be automatically pushed towards the retracted position. As long as the front wheel rolls forward, the wire form member 46 will be prevented from returning to the locking position. However, the bicycle rider should, of course, manually lock the wire form member 46 into its retracted or release position by pushing it up so it is caught between the dimples 66A and 66B. The position of the dimples relative to the holes receiving the wire form member 43 should preferably be such that the wire form member will not contact the down tube 22, so that the paint will not be scratched or marred.

The device according to the invention can be easily sold as a retrofit kit for substantially any multispeed bicycle having shifter bosses 20 brazed directly on a down tube, affixed by a C-clamp onto a down tube, or mounted on a rod or tube which passes through the down tube. When sold as a retrofit kit, the right and left bracket members can replace the conventional shifter stops in a standard shifter assembly. For some model shifter assemblies, it may be necessary to insert one or more lock washers 74 between the lever covers 38 and adjusting bolts 40. The front wheel holder according to the invention can be used with bicycles having enlarged diameter down tubes common in aluminum bicycles. It its simple to install and unobtrusive in appearance, and aside from the right and left bracket members which are attached to the shifter bosses, no part of the device contacts down the tube.

While one preferred embodiment according to the invention has been shown and described, numerous variations and modifications will readily occur to those skilled in the art. Accordingly, the present invention is not limited to the embodiment illustrated, but is to be limited only in accordance with the appended claims.

We claim:

1. A bicycle front wheel holder for holding the front wheel of a bicycle in fixed rotational position relative to the bicycle frame and for keeping the front wheel from turning, comprising:
    a wire form member having a first free end and a second free end and a loop in its mid-section spaced-apart from its first and second free ends;
    a first bracket member connected to the right shifter boss on the down tube of a bicycle and having means for pivotally receiving the first free end of the wire form member; and a second bracket member connected to the left shifter boss on the down tube of a bicycle and having means for pivotally receiving the second free end of the wire form member;

said receiving means mounting the wire form member such that it extends away from the down tube and firmly contacts the front wheel to keep it from rotating and turning when the wire form member is in a first pivotal position relative to the bracket members, and extends away from, and is free of contact with, the front wheel when the wire form member is in a second pivotal position relative to the bracket members.

2. The bicycle wheel holder according to claim 1 wherein at least one of the bracket members has means for holding the wire form member in the second pivotal position.

3. The bicycle wheel holder according to claim 1 wherein each of the bracket members is generally flat and has a central opening adapted to be fitted in registration with the shifter bosses so that they remain fixed from rotation in relation thereto.

4. The bicycle wheel holder according to claim 3 wherein the bracket member has a shift lever stopper so that the bracket member may replace the shift lever stopper member in a standard shift lever assembly.

5. The bicycle wheel holder according to claim 4 wherein the shift lever stopper comprises an arm portion extending away from the down tube when the washer member is received in registration on the shifter stud.

6. The bicycle wheel holder according to claim 1 wherein the means for receiving the ends of the wire form member on the respective bracket members comprises holes in the bracket members on their inner sides facing each other, and wherein the free ends of the wire form member have portions that extend outwardly from each other and into the holes.

7. The bicycle wheel holder according to claim 6 wherein each bracket member has more than one hole for receiving the respective end of the wire form member to provide a means for adjusting the position of the wire form loop portion relative to the front bicycle wheel.

8. The bicycle wheel holder according to claim 6 wherein the wire form member is bendable so that the arms can be cured to adjust the position of the wire form loop portion relative to the front bicycle wheel.

9. The bicycle wheel holder according to claim 6 wherein the free ends of the wire form member are spaced from each other slightly more than the distance between the inner sides of the bracket members, so that the ends of the wire form member will be slightly resiliently compressed towards each other and be resiliently held in the holes.

10. The bicycle wheel holder according to claim 9, wherein the means for holding the wire form member in the second position comprises at least one raised dimple on the inner side of at least one of the bracket members.

11. The bicycle wheel holder according to claim 10 wherein each bracket member has at least two raised dimples to receive the wire form member therebetween to hold the wire form member in the second pivotal position and free of contact with the down tube of the bicycle.

12. The bicycle wheel holder according to claim 1 further including a depending flange formed on at least one of the bracket members for restricting movement of the wire form member beyond the first pivotal position.

* * * * *